United States Patent
Shimokura

[11] 4,170,403
[45] Oct. 9, 1979

[54] RETRO FOCUS TYPE WIDE ANGLE LENS

[75] Inventor: Toshiko Shimokura, Hachioji, Japan

[73] Assignee: Konishiroku Photo Industry Co., Ltd., Tokyo, Japan

[21] Appl. No.: 848,016

[22] Filed: Nov. 2, 1977

[30] Foreign Application Priority Data

Nov. 9, 1976 [JP] Japan .................. 51-134561

[51] Int. Cl.² ............................. G02B 9/60
[52] U.S. Cl. .................................. 350/216
[58] Field of Search ................. 350/216, 176

[56] References Cited
U.S. PATENT DOCUMENTS
3,731,989  5/1973  Shimizu .................. 350/216

Primary Examiner—Paul A. Sacher
Attorney, Agent, or Firm—Bierman & Bierman

[57] ABSTRACT

A retro-focus wide angle lens which, as viewed from the object side, includes a first lens group of a single negative meniscus lens with its convex surface directed to the object side, a second lens group consisting of a single biconvex lens, a third lens group consisting of a single biconcave lens and fourth and fifth lens groups each consisting of a single positive meniscus lens having a concave surface directed to the object side.

1 Claim, 6 Drawing Figures

SPHERICAL ABERRATION    ASTIGMATISM    DISTORTION ABERRATION

RETRO FOCUS TYPE WIDE ANGLE LENS

The present invention relates to a retro-focus type wide angle lens consisting of a lens system having five groups of lenses.

More particularly, the present invention is concerned with a retro-focus type wide angle lens system having a back focus $f_B$ kept to be 1.1 to 1.3 times a composite focal length f, an angle of field of 62° to 76° and an F number of 2.8 to 3.5, wherein various aberrations are sufficiently corrected.

Recently, various retro-focus type wide angle lenses having an F number of 2.8 to 3.5 and an angle of field of 62° to 76° have been proposed, which consist of a lens system having five lenses of negative, positive, negative, positive and positive, arrayed in the mentioned sequence. In these retro-focus type wide angle lenses, correction of aberrations is made in accordance with such policy as to improve the front portion of the lens system. For instance, negative coma and distortion aberration caused by the front first negative lens are corrected by making the distance between the second positive lens L2 and the third negative lens L3 large, or by increasing the power of the second positive lens.

However, it is not a good policy as a method of aberration correction to entirely owe such aberration correction solely to the front portion system, because this portion of a retro-focus type wide angle lens plays an important role for obtaining a good wide angle and a sufficiently long back focus.

For example, in a retro-focus type wide angle lens having a negative lens arranged at the front extreme, it is a common practice to impart diverging power required for obtaining a large angle of field and diverging power required for lengthening the back focus to this front extreme. Increase in these diverging power is inevitably accompanied by increased negative coma and distortion aberration. If these aberrations are to be corrected only at the front portion of the lens system, positive power at this portion will be high with the result that effective diameter of the front extreme lens has to be unacceptably large. This disadvantage cannot be overlooked especially in lens systems having few lenses.

The present invention is aiming at providing a compact retro-focus type with angle lens having a simplified construction, in which coma and distortion aberrations caused by the negative front extreme lens for maintaining a long $f_B$ is corrected mainly at the back portion of the lens system, rather than solely at the front portion, while maintaining the required long $f_B$ and the F number.

The invention will now be described in detail by reference to the accompanying drawings in which.

Figure 1:
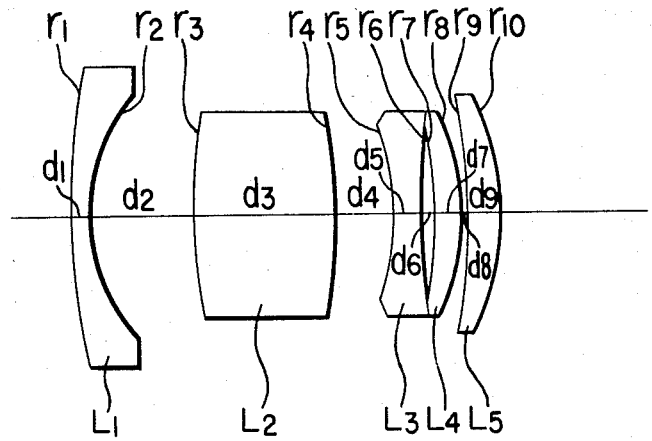
FIGS. 1, 3 and 5 are illustrations of lens systems which are a first, seccond and third embodiments of the present invention, respectively.
Figure 3:
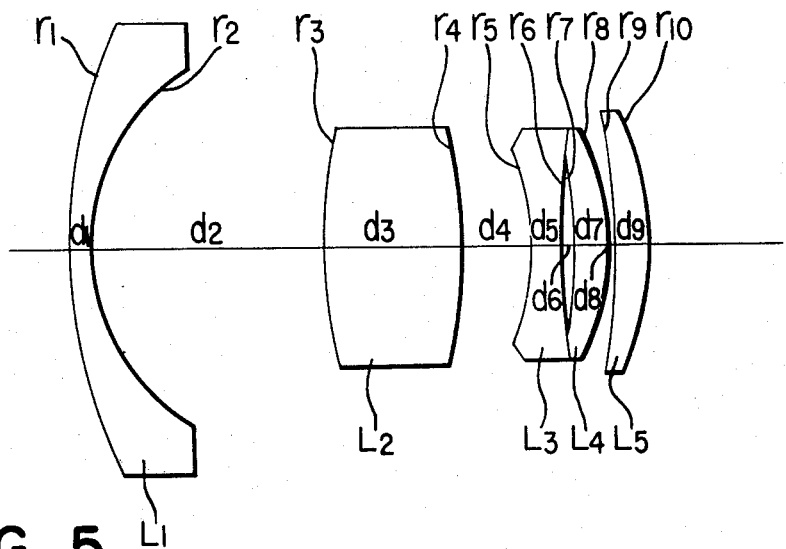
Figure 5:
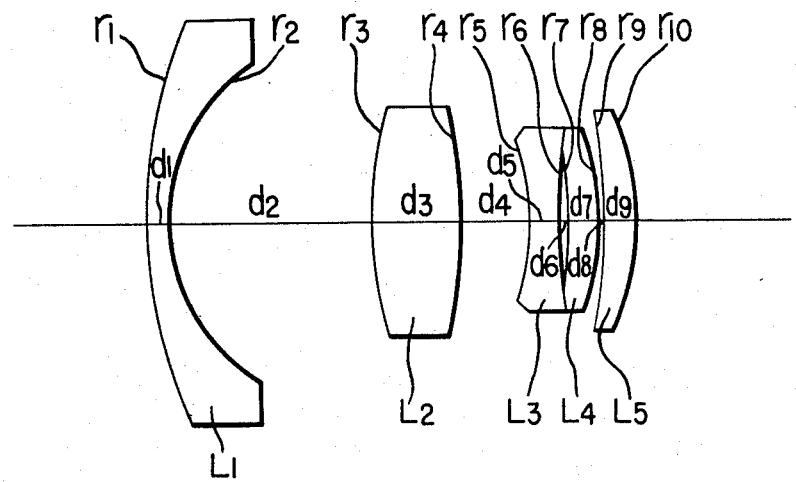
Figure 2:
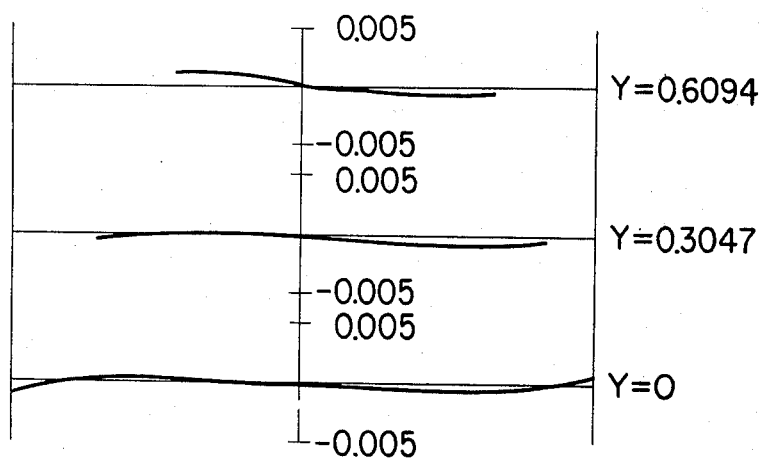
FIGS. 2, 4 and 6 are aberration curves of the first, second and third embodiments of the invention, respectively.
Figure 2:
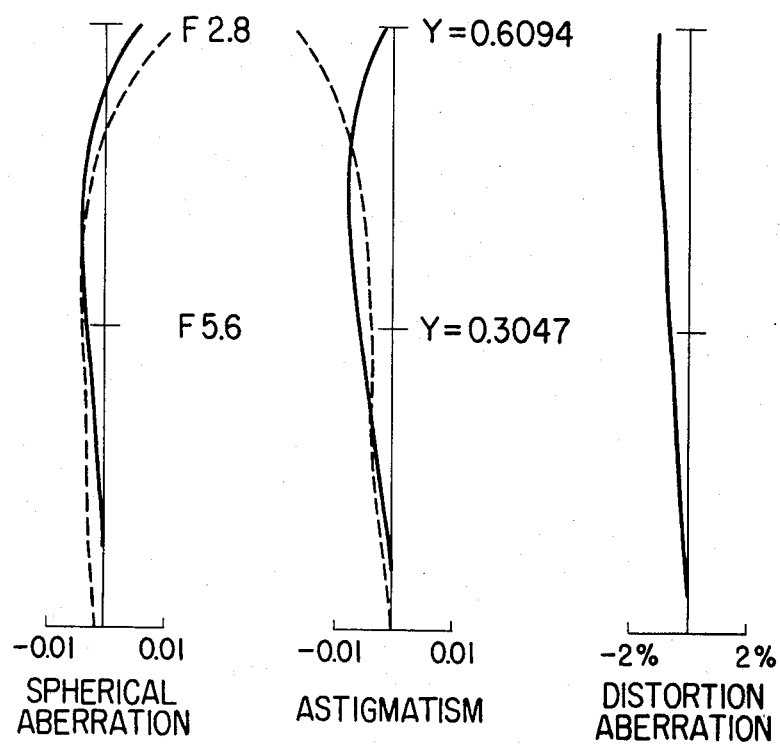
Figure 4:
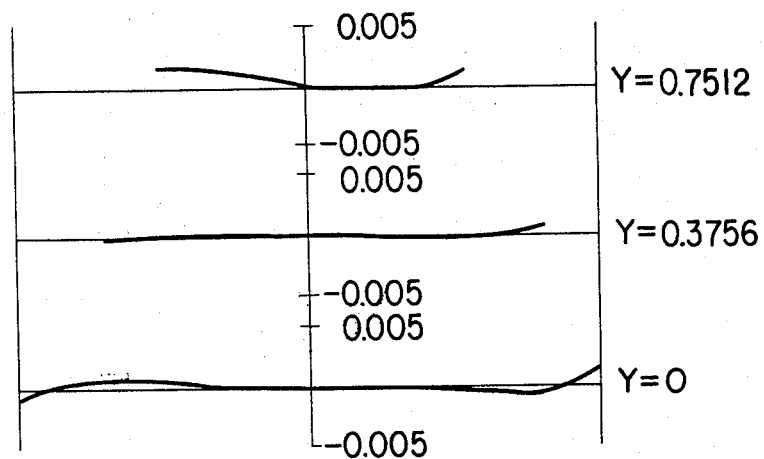
Figure 4:
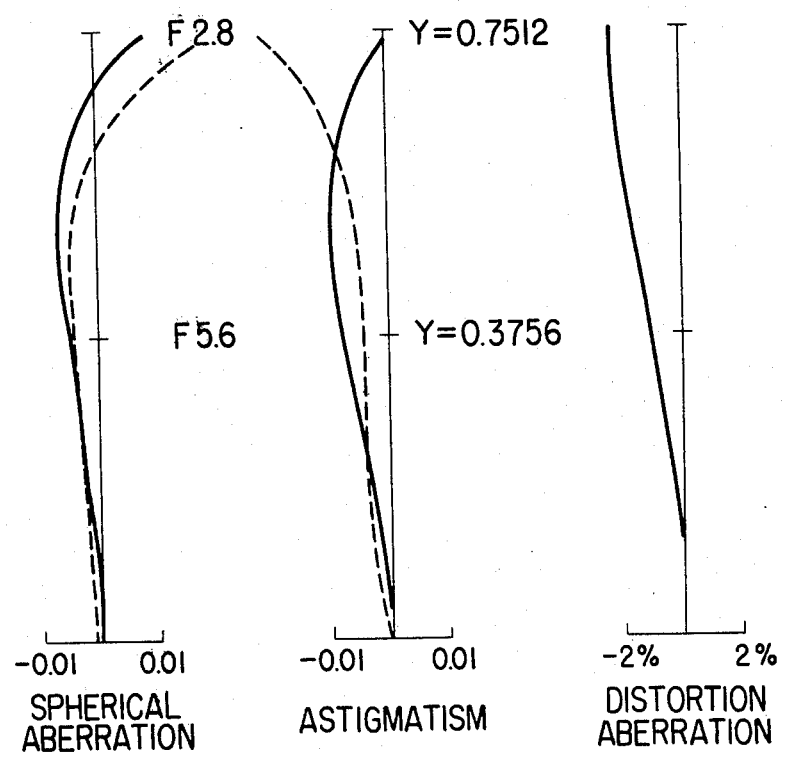
Figure 6:
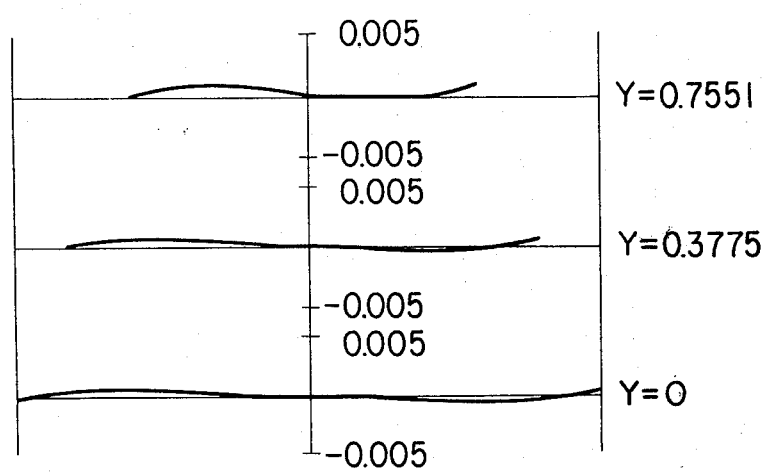
Figure 6:
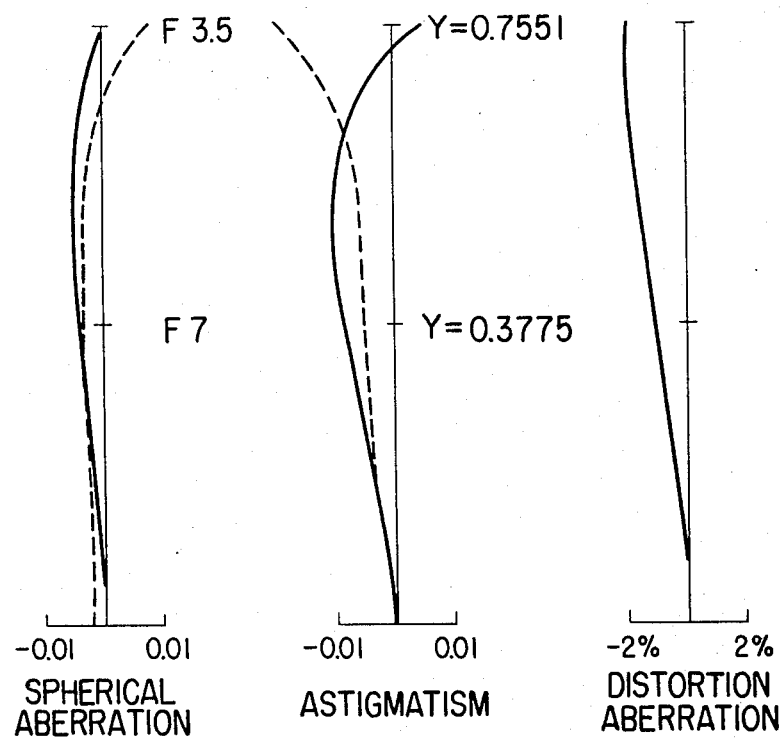

As shown in FIG. 1, a lens system embodying the invention comprises, as viewed from the object side, a first group consisting of a single negative miniscus lens L1 disposed to direct its convex surface to the object side, a second group consisting of a single positive lens L2 having both convex surfaces, a third group consisting of a single negative lens L3 having both concave surfaces, and fourth and fifth groups each of which consisting of a single positive meniscus lenses L4 and L5, respectively, each having concave surface directed to the object side.

In addition, the lens system in accordance with the invention should satisfy the following requirements:

$$1.60 < (n_4 + n_5)/2 < 1.85 \tag{1}$$

where $n_4$ and $n_5$ represent refractive indexes of the glass material of lenses L4 and L5, with respect to line d.

$$0.05f < d_5 < 0.09f \tag{2}$$

where f is a composite focal length of the whole system and $d_5$ denotes the thickness of lens L3 on its axis, $$0.13f < d_4 < 0.19f \tag{3}$$

$$0.15f < d_3 < 0.4f \tag{4}$$

where $d_4$ represents the distance between lenses L2 and L3 as measured on their axis and $d_3$ denotes the thickness of lens L2 as measured on its axis.

Hereinafter, technical backgrounds and significances of above requirements of the invention will be discussed.

As shown in FIG. 1, the lens system in accordance with the invention comprises five groups of negative meniscus lens L1, biconvex lens L2, biconcave lens L3, and positive meniscus lenses L4 and L5 having their concave surfaces directed to the object side. Conventionally, in such a simple lens system as above-mentioned, diverging coma and distortion aberrations produced by the front extreme lens have been corrected by means for enlarging the distance between second lens L2 and third lens L3 or by intensifying the image-side curvature of second lens L2.

In the lens system of the invention, the first lens L1 is provided with a considerably large negative power, for retaining a long back focus $f_B$ which is as large as 1.1 to 1.3 times that of the focal length f. The coma and distortion aberrations inevitably produced at the first lens L1 are corrected mainly at the back portion of the lens system. More specifically, this correcting measure is well represented by the fact that two positive lenses positioned at the back portion of the system are constituted by meniscus positive lenses with their concave surfaces directed to the object side. Namely, it is intended that an image is converted to larger side by means of diverging functions exerted by the concave surfaces of the two positive lenses directed to the object side, so as to strongly correct the negative distortion aberration caused by the negative front extreme lens.

However, in the retro-focus type lens of this sort, negative powers provided by the lenses down to L3 are very high and positive power of two positive lenses at the back side is correspondingly large. Therefore, when it is desired that the object side surfaces of fourth and fifth lenses L4 and L5 are to be concave, it is strictly required to take a measure to avoid excessive positive powers at the image-side surfaces of these lenses.

According to the invention, in order to obtain such a countermeasure without losing the effectiveness of the intended diverging function, there is provided a restriction or requirement (1) expressed by the equation of $1.60 < (n_4 + n_5)/2 < 1.85$. The lower limit value of the above equation is a threshold value for obtaining the above stated countermeasure while the upper limit of the above equation represents a threshold for obtaining a balance with the color divergencies for these positive lenses.

Further, according to the invention, there is provided the second requirement (2) $0.05f < d_5 < 0.09f$ in order to ensure the effect of above countermeasure. Namely, the light flux passing through the concave surfaces of both positive lenses L4, L5 and image-side surface of the lens L3 is diverged toward the peripheral side by making $d_5$ (thickness of lens L3) rather thick so as to make divergency of the concave surfaces of the two positive lenses L4 and L5 larger. Thus, the lower limit value of the above requirement (2) represents the lower threshold for effectiveness of this improvement, while the upper limit value of above requirement (2) represents the threshold for effectiveness of correction of color aberration at the back portion of the lens system. In addition to the correcting measure provided at the back portion of the lens system, a correcting function at the front portion itself of the lens system is promoted by defining the distance between the lenses L2 and L3 and the thickness of the second lens L2 as follows;

$$0.13f < d_4 < 0.19f \quad (3)$$

$$0.15f < d_3 < 0.4f \quad (4)$$

Generally speaking, there has been known in lens systems of this kind a correction method in which air gap or the distance $d_4$ between second lens L2 and third lens L3 is selected to be large while providing second lens L2 with a large positive power and thickness in order to correct negative coma and distortion aberrations caused by the first lens as well as a spherical aberration excessively corrected. However, considering the relation between the converging effect of the air gap and the thickness of the lens, it is not a good policy to make the air gap $d_4$ excessively large. Namely, although the correction of distortion aberration is effectively made if the distance $d_4$ is selected to be excessively large, disadvantages such as increase in the Petzval sum accompanied by increment of curvature of merigional image surface toward negative side and increase in effective diameter of the first lens are brought about.

Therefore, in the lens system of the invention, the air gap or distance between the second and the third lenses L2 and L3 is kept so small as to allow insertion of a diaphragm, and converging function provided by the thickness of the second lens L2 is thought much of in respect of correction. Thus, the lower limit of the requirement (3) is a threshold to preserve mechanical dimension for insertion of the diaphragm while the upper limit represents a threshold determined so as not to incur the disadvantage such as increase in Petzval sum and so on. It is also to be noted that the requirement (4) is determined in relation to the requirement (3). Namely, as $d_3$ becomes smaller beyond the lower limit of the requirement (4), the converging effect becomes insufficient while as $d_3$ gets larger than the upper limit the converging effect becomes excessive with the result that it will be difficult to obtain a long back focus and other disadvantages such as too negative spherical aberration will occur.

Following tables show some embodiments of the present invention.

EXAMPLE 1

| $f = 1$ | F 2.8 | $2\omega = 64°$ | $f_B = 1.116$ |
|---|---|---|---|
| $r_1 = 1.4169$ | $d_1 = 0.0423$ | $nd_1 = 1.5163$ | $vd_1 = 64.1$ |
| $r_2 = 0.4143$ | $d_2 = 0.2540$ | | |
| $r_3 = 0.7614$ | $d_3 = 0.3386$ | $nd_2 = 1.7570$ | $vd_2 = 47.9$ |
| $r_4 = -1.3390$ | $d_4 = 0.1467$ | | |
| $r_5 = -0.5800$ | $d_5 = 0.0705$ | $nd_3 = 1.7407$ | $vd_3 = 27.8$ |
| $r_6 = 1.4698$ | $d_6 = 0.0372$ | | |
| $r_7 = -0.8472$ | $d_7 = 0.0592$ | $nd_4 = 1.6968$ | $vd_4 = 55.5$ |
| $r_8 = -0.5243$ | $d_8 = 0.0028$ | | |
| $r_9 = -13.986$ | $d_9 = 0.0874$ | $nd_5 = 1.7130$ | $vd_5 = 53.9$ |
| $r_{10} = -0.6324$ | | | |

| Seidel Aberration Coefficient of Example 1 | | | | | |
|---|---|---|---|---|---|
| | S | C | A | P | D |
| 1 | 0.0795 | 0.0777 | 0.0759 | 0.2403 | 0.3090 |
| 2 | −10.8808 | 1.0623 | −0.1037 | −0.8219 | 0.0904 |
| 3 | 7.2098 | 1.0044 | 0.1399 | 0.5658 | 0.0983 |
| 4 | 3.4101 | −1.8068 | 0.9573 | 0.3217 | −0.6776 |
| 5 | −8.0078 | 2.3751 | −0.7044 | −0.7336 | 0.4265 |
| 6 | −1.6288 | −1.2475 | −0.9554 | −0.2895 | −0.9534 |
| 7 | 0.0434 | −0.0913 | 0.1922 | −0.847 | 0.6156 |
| 8 | 1.5111 | −0.4537 | 0.1362 | 0.7831 | −0.2760 |
| 9 | 0.0019 | 0.0144 | 0.1086 | −0.0298 | 0.5911 |
| 10 | 9.3529 | −0.9709 | 0.1008 | 0.6582 | −0.0788 |
| Σ | 1.0912 | −0.0363 | −0.0526 | 0.2097 | 0.1450 |

These coefficients are for infinite object distance and position of diaphragm at 0.07 behind the fourth lens surface. S, C and A represent, respectively, coefficients of spherical aberration, coma aberration and astigmatism while P and D represent Petzval's term and distortion aberration, respectively. Σ represents the sum of aberration coefficients.

EXAMPLE 2

| $f = 1$ | F 2.8 | $2\omega = 75°$ | $f_B = 1.219$ |
|---|---|---|---|
| $r_1 = 1.1263$ | $d_1 = 0.0521$ | $nd_1 = 1.6230$ | $vd_1 = 58.2$ |
| $r_2 = 0.4869$ | $d_2 = 0.5555$ | | |
| $r_3 = 0.9921$ | $d_3 = 0.3194$ | $nd_2 = 1.7859$ | $vd_2 = 44.2$ |
| $r_4 = -1.4612$ | $d_4 = 0.1736$ | | |
| $r_5 = -0.5742$ | $d_5 = 0.0729$ | $nd_3 = 1.7407$ | $vd_3 = 27.8$ |
| $r_6 = 1.6640$ | $d_6 = 0.0278$ | | |
| $r_7 = -1.8897$ | $d_7 = 0.0764$ | $nd_4 = 1.6968$ | $vd_4 = 55.5$ |
| $r_8 = -0.5883$ | $d_8 = 0.0035$ | | |
| $r_9 = -2.7570$ | $d_9 = 0.0799$ | $nd_5 = 1.6968$ | $vd_5 = 55.5$ |
| $r_{10} = -0.7365$ | | | |

| Seidel Aberration Coefficient of Example 2 | | | | | |
|---|---|---|---|---|---|
| | S | C | A | P | D |
| 1 | 0.1655 | 0.0891 | 0.0480 | 0.3407 | 0.2094 |
| 2 | −6.6445 | 1.2020 | −0.2174 | −0.7883 | 0.1819 |
| 3 | 4.9329 | 1.0143 | 0.2086 | 0.4435 | 0.1341 |
| 4 | 4.9282 | −2.1231 | 0.9146 | 0.3011 | −0.5237 |
| 5 | −12.3120 | 2.7072 | −0.5953 | 0.7410 | 0.2938 |
| 6 | −1.9778 | −1.3539 | −0.9268 | −0.2557 | −0.8095 |
| 7 | 0.0288 | 0.1051 | 0.3834 | −0.2173 | 0.6059 |
| 8 | 3.5568 | −0.7469 | 0.1568 | 0.6980 | −0.1795 |
| 9 | −0.0877 | 0.1077 | −0.1322 | −0.1489 | 0.3452 |
| 10 | 9.0518 | −1.0152 | 0.1138 | 0.5575 | −0.0753 |
| Σ | 1.6420 | −0.0135 | −0.0463 | 0.1897 | 0.1824 |

These coefficients are for infinite object distance and a diaphragm position of 0.07 behind the fourth lens surface. S, C, A, P and D represent, respectively, coefficients of spherical aberration, coma aberration, astigmatism, term of Petzval and coefficient of distortion aberration. Σ represents the sum of aberration coefficients.

EXAMPLE 3

| f = 1 | F 3.5 | 2ω = 75° | $f_B$ = 1.241 |
|---|---|---|---|
| $r_1$ = 1.0809 | $d_1$ = 0.0523 | $nd_1$ = 1.5891 | $\nu d_1$ = 61.1 |
| $r_2$ = 0.4386 | $d_2$ = 0.4886 | | |
| $r_3$ = 0.8076 | $d_3$ = 0.2094 | $nd_2$ = 1.7200 | $\nu d_2$ = 43.7 |
| $r_4$ = −1.4515 | $d_4$ = 0.1675 | | |
| $r_5$ = −0.5466 | $d_5$ = 0.0698 | $nd_3$ = 1.7847 | $\nu d_3$ = 26.2 |
| $r_6$ = 1.5009 | $d_6$ = 0.0209 | | |
| $r_7$ = −1.9748 | $d_7$ = 0.0698 | $nd_4$ = 1.8061 | $\nu d_4$ = 40.9 |
| $r_8$ = −0.5869 | $d_8$ = 0.0035 | | |
| $r_9$ = −2.2968 | $d_9$ = 0.0698 | $nd_5$ = 1.6230 | $\nu d_5$ = 58.2 |
| $r_{10}$ = −0.6203 | | | |

Seidel Aberration Coefficients of Example 3

| | S | C | A | P | D |
|---|---|---|---|---|---|
| 1 | 0.1834 | 0.1027 | 0.0575 | 0.3429 | 0.2243 |
| 2 | −8.7613 | 1.3312 | −0.2023 | −0.8452 | 0.1592 |
| 3 | 7.5275 | 1.3255 | 0.2334 | 0.5183 | 0.1324 |
| 4 | 4.8099 | −2.1246 | 0.9385 | 0.2884 | −0.5419 |
| 5 | −13.8309 | 3.1072 | −0.6981 | −0.8043 | 0.3375 |
| 6 | −3.9010 | −2.1583 | −1.1942 | −0.2929 | −0.8228 |
| 7 | 0.2105 | 0.3603 | 0.6166 | −0.2260 | 0.6684 |
| 8 | 3.3756 | −0.8134 | 0.1960 | 0.7605 | −0.2305 |
| 9 | −0.0857 | 0.1007 | −0.1182 | −0.1671 | 0.3352 |
| 10 | 12.1392 | −1.2943 | 0.1380 | 0.6188 | −0.0807 |
| Σ | 1.6672 | −0.0629 | −0.0327 | 0.1934 | 0.1811 |

These coefficients are for infinite object distance and a diaphragm position of 0.087 behind the fourth lens surface. S, C, A, P and D represent, respectively, coefficients of spherical aberration, coma aberration, astigmatism, term of Petzval and coefficient of distortion aberration. Σ represents the sum of aberration coefficients.

As will be seen from the foregoing description, a reasonable aberration correction is made over the lens system as a whole in the lens system of the invention. Consequently, according to the invention, there is provided a compact retro-focus type wide angle lens in which aberrations are sufficiently corrected in spite of a small number of lenses.

What we claim is:

1. A retro-focus type wide angle lens comprising, as viewed from the object side, a first group consisting of a single negative meniscus lens L1 with its convex surface directed to the object side, a second group consisting of a single biconvex lens L2, a third group consisting of a single biconcave lens L3, and a fourth and a fifth groups each of which consists of a single positive meniscus lens with its concave surface directed to the object side, wherein the following requirements should be satisfied:

$$1.69<(n_4+n_5)/2<1.72 \quad (1)$$

where $n_4$ and $n_5$ are refraction indexes of the glass materials of lenses L4 and L5 respectively with respect to line d, $$0.06f<d_5<0.08f \quad (2)$$

where f denotes a composite focal length of the system as a whole while $d_5$ denotes thickness of lens L3 as measured along its axis, $$0.14f<d_4<0.18f \text{ and} \quad (3)$$

$$0.20f<d_3<0.34f \quad (4)$$

where $d_4$ represents distance between lenses L2 and L3 as measured along their axis and $d_3$ represents thickness of lens L2 as measured along its axis.

* * * * *